July 10, 1962 P. A. HILL 3,043,731
COMPRESSIBLE FOAM PRODUCT
Filed Oct. 14, 1959 2 Sheets-Sheet 1
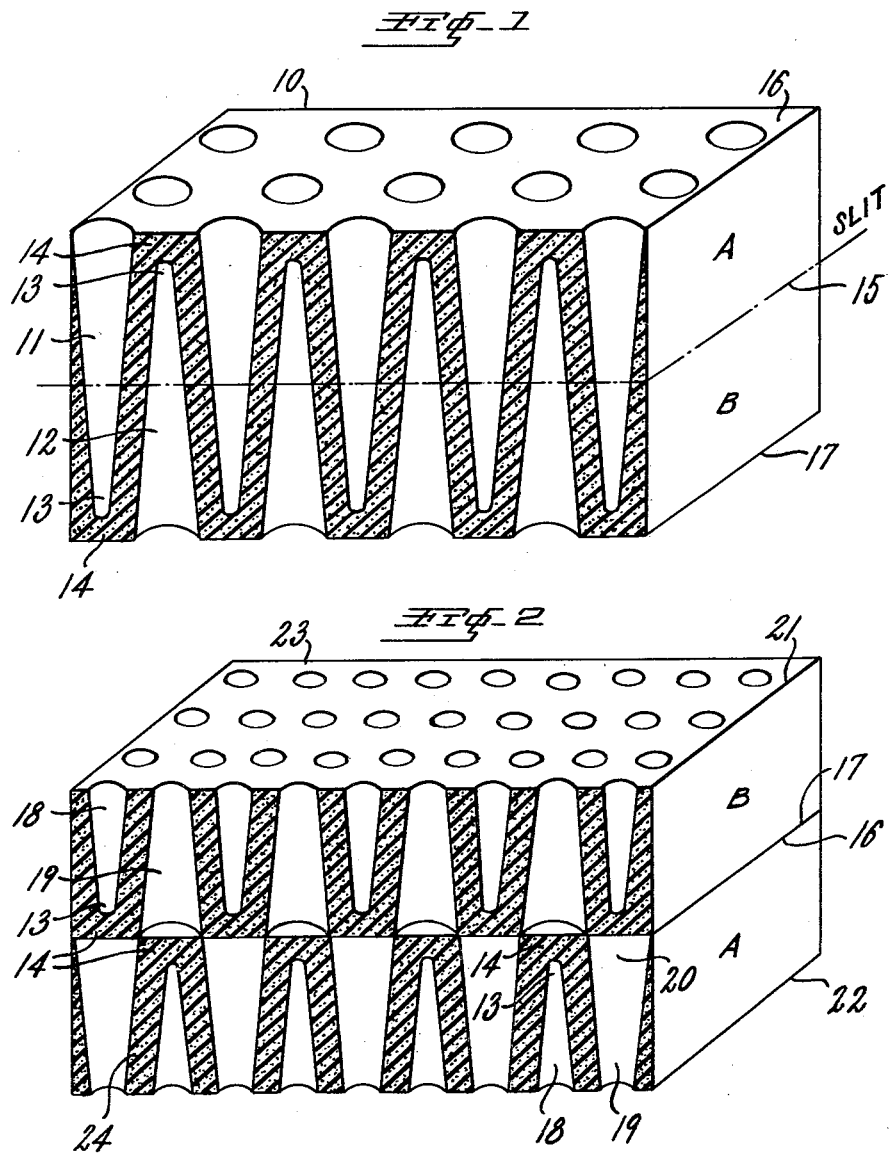
INVENTOR.
PEDRO A. HILL
BY Charles A. Blank
ATTORNEY

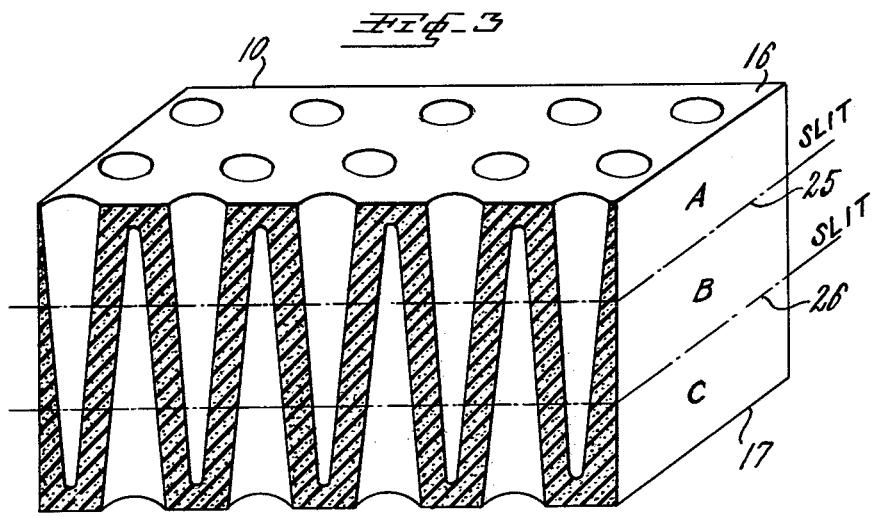
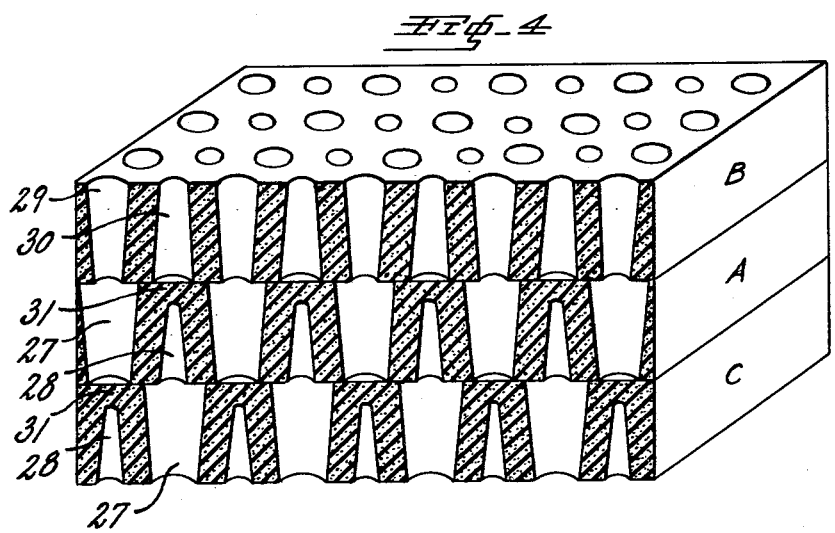

United States Patent Office 3,043,731
Patented July 10, 1962

3,043,731
COMPRESSIBLE FOAM PRODUCT
Pedro A. Hill, Santa Ana, Calif., assignor to United States Rubber Company, New York, N.Y., a corporation of New Jersey
Filed Oct. 14, 1959, Ser. No. 846,464
5 Claims. (Cl. 154—54)

This invention relates to compressible foam products of sponge rubber or other elastomers for use primarily as reversible cushions, sleeping pads or mattresses, although other uses are contemplated, and to methods of manufacturing the same. "Elastomer" is a generic term for all organic, elastic polymers of either natural or synthetic origin and includes natural rubber, synthetic rubber, elastic polyurethane resins and other rubber-like organic materials. In the following description "foam rubber" is used as an illustrative example of elastomers.

Foam rubber mattresses, cushions, and similar articles heretofore commercially available have usually consisted of a uniform slab of foam rubber, generally with numerous cored openings extending through or substantially through the article from top to bottom, this having been accomplished by vulcanizing latex foam in a suitable mold with core pins extending through the mold cavity from one wall thereof close to or abutting against the opposed wall of the cavity. This construction results in a large percentage of apertures in the molded article which, in turn, makes possible rapid drying of the product and, at the same time, enables the minimum of rubber to carry the maximum load.

Articles of different internal and external patterns, and with various amounts of cored-out volumes are available depending on the design and position of the core-pins within the mold. However, an optimum displacement of foam rubber eliminated by the core-pins necessarily exists beyond which the advantage of high load carrying capacity from low material usage is eradicated.

In addition, the surface appearance of a cored foam product is most pleasing when the aperture openings are of minimum size. Small apertures, however, do not result in saving any great quantity of foam rubber, nor do they result in the greatest comfort in the foam product. In contrast, large apertures eliminate great quantities of foam rubber but may thereby sacrifice other important features such as appearance, comfort, compressibility and resiliency.

Further, there is some difficulty in producing foamed articles which have blemish-free surfaces, because of the entrapped air around the base of the core pin. This results in voids in the surface of the article which detract from its appearance, and in some cases results in the cushion failing to pass inspections.

The principal object of this invention is to provide new and improved compressible foam products by which the above mentioned disadvantages are overcome.

A more specific object of the present invention is to provide novel compressible foam products so constructed as to use a minimum of foam rubber with maximum core-displacement and yet display only small aperture openings on the surface.

In accordance with this invention, a compressible foam product is formed comprising a composite slab of foam rubber having an upper portion and a lower portion, each portion having a series of tapered apertures therein, each aperture being reversely tapered with respect to its neighboring aperture, each individual aperture in the upper portion having a common axis with an individual aperture in the lower portion, those apertures having a common axis having their walls discontinuous.

Other objects and a fuller understanding of the invention may be had by referring to the following description and claims, taken in conjunction with the accompanying drawings. The term "tapered apertures" is used herein and in the claims to denote apertures of conical and/or frusto-conical design. The apex angle of these apertures may be about 15°.

In the accompanying drawings:
FIGURE 1 is a fragmentary perspective view of a slab of foam rubber flatstock having a series of reversely tapered apertures therein and illustrating a preferred plane of slitting.
FIGURE 2 is a fragmentary perspective view of a preferred embodiment of the invention, formable from the foam rubber flatstock of FIGURE 1.
FIGURE 3 is a fragmentary perspective view of a slab of foam rubber flatstock having a series of reversely tapered apertures therein and illustrating alternate planes of slitting.
FIGURE 4 is a fragmentary perspective view of another embodiment of the invention, formable from the foam rubber flatstock of FIGURE 3.

Referring first to FIGURE 1, a slab of foam rubber flatstock 10, having a series of reversely tapered apertures 11 and 12 therein, the smaller end 13 of each aperture terminating in top stock 14, is formed in a suitable mold and laterally sliced along the center line 15 in a plane substantially parallel to its top face 16 and its bottom face 17, thereby forming two slab portions A and B. The slicing operation can be performed by a number of instruments, for example, a band saw, hand saw, or a conventional blade type slitter, common in the foam industry.

As more clearly shown in FIGURE 2, the slicing operation results in each of the two slab portions A and B having a series of reversely tapered apertures 18 and 19 therein, the small ends 13 of alternating apertures 18 terminating in top stock 14, and alternating apertures 19 extending continuously throughout the slab portions. The two slab portions A and B are then superposed one on the other so that the bottom face 17 of the original slab of foam rubber flatstock 10 completely abuts the top face 16 of the original slab, and the small ends 13 of alternating apertures 18 terminating in top stock 14 in one slab portion are axially adjacent the large ends 20 of alternating apertures 19 in the other slab portion in a plane between and parallel to the top face 21 and bottom face 22 of the composite slab 23, the walls 24 of the axially adjacent apertures being discontinuous. The two superposed slab portions A and B are secured together in this position by any suitable means, for example, by cementing them together with a suitable rubber adhesive.

In the preferred embodiment of the invention described above, a compressible foam product is formed comprising a composite slab of foam rubber with upper and lower slab portions, each slab portion having a series of tapered apertures therein, each aperture being reversely tapered with respect to its neighboring aperture. The smaller end of alternate apertures terminate in top stock, the terminal top stock being located in a plane between and parallel to the top and bottom face of the product and adjacent an open end of an aperture which extends continuously through a superposed portion. Each individual aperture in one slab portion thereby has a common axis with an individual aperture in the other slab portion, those apertures having a common axis having their walls discontinuous.

A cross-sectional view, as shown in FIGURE 2, of the above described product bisecting the upper and lower slab portions along a series of reversely tapered apertures reveals an internal truss structure in each portion formed by the walls 24 and top stock 14 of alternating aperture 18. The high load carrying capacity of the product with maximum core displacement and low material usage results from the combination of truss structures of the two layers. For example, as compared to an equally thick, uniform slab of cylindrically-cored foam rubber of the same latex formulation, the product of the invention described in FIGURE 2 supported the same load with approximately a 9% saving in material.

Thus the product of the invention has a large displacement of core area buried internally with the appearance of small openings on the surface, thereby realizing the advantages of having large cored-out areas without detracting from the appearance, comfort and compressibility of the product.

FIGURE 3 is identical with FIGURE 1 except that it illustrates the slab of foam rubber flatstock being laterally trisected along the lines 25 and 26 in planes substantially parallel to its top face 16 and bottom face 17, thereby forming three slab portions, A, B and C.

Referring now to FIGURE 4, the slicing operation results in each of the three slab portions having a series of reversely tapered apertures therein, that is reversely tapered apertures 27 and 28 in slab portions A and C and reversely tapered apertures 29 and 30 in slab portion B. The small ends of apertures 28 in slab portions A and C terminate in top stock 31, and apertures 27 in slab portions A and C as well as alternating apertures 29 and 30 in slab portion B extend continuously throughout said slab portions.

The three slab portions are superposed one on the other, positioned as shown in FIGURE 4, and secured together by any suitable means, for example, a rubber adhesive. Slab portions A and B are thereby reversed in relation to each other while slab portion C is inverted so that its slit surface now becomes an external surface of the completed product.

In this alternate embodiment of the invention, a compressible foam product is formed comprising a composite slab of foam rubber with upper, middle and lower portions. There is in each portion a series of tapered apertures, each aperture being reversely tapered with respect to its neighboring aperture. The small ends of a plurality of apertures 29 in the upper portion lie axially adjacent the large ends of a plurality of apertures 27 in the middle portion and the large ends of a second plurality of apertures 28 in the middle portion lie axially adjacent the larger ends of a plurality of apertures 27 in the lower portion. Each individual aperture in one slab portion thereby has a common axis with individual apertures in the other slab portions, those apertures having a common axis having their walls discontinuous.

From the drawings and the above description, it is seen that the present invention has provided compressible foam products of sponge rubber or other elastomers for use primarily as reversible cushions, sleeping pads or mattresses, and of such construction as to have a number of advantages. In each case, the slab portions with their internal truss-like structure, when assembled in accordance with the invention, react upon each other to form a product having a high load carrying capacity and maximum core displacement, thereby utilizing a minimum amount of material for a given compression it has to withstand.

In addition, the surface appearance of the articles encompassed within the scope of the invention is improved since only small aperture openings are exposed, in contrast to the large aperture openings of the original foam flatstock, the advantages of having large cored-out areas still being realized.

Further, since the more perfect internal structure is now presented as the external surface, the difficulty in producing foamed articles which have blemish-free surfaces, due to the entrapped air around the base of the core pin, has been eliminated.

Various changes may be made in the embodiments of the compressible foam products hereinabove specifically described without departing from or sacrificing the advantages of the invention as defined in the appended claims.

Having thus described my invention, what I claim and desire to protect by Letters Patent is:

1. A compressible foam product comprising a composite slab of foam rubber having adhesively secured superposed portions, each portion having a series of tapered apertures therein, each aperture being reversely tapered with respect to its neighboring aperture in the same portion, each individual aperture in one portion having a common axis with an individual aperture in other portions, the smaller end of alternate apertures in at least one portion terminating in top stock, said terminal top stock being located in a plane between and substantially parallel to the top and bottom faces of said product and adjacent an open end of an aperture which extends continuously through a superposed portion.

2. A compresible foam product comprising a composite slab of foam rubber having adhesively secured superposed upper and lower portions, each portion having a series of tapered apertures therein, each aperture being reversely tapered with respect to its neighboring aperture in the same portion, each individual aperture in one portion having a common axis with an individual aperture in the other portion, the smaller end of alternate apertures in each portion terminating in top stock, said terminal top stock being located in a plane between and substantially parallel to the top and bottom faces of said product and adjacent an open end of an aperture which extends continuously through a superposed portion.

3. A compressible foam product comprising a composite slab of foam rubber having adhesively secured superposed upper, middle and lower portions, each portion having a series of tapered apertures therein, each aperture being reversely tapered with respect to its neighboring aperture in the same portion, each individual aperture in one portion having a common axis with an individual aperture in the other portions, the smaller end of alternate apertures in said lower and middle portion terminating in top stock, said terminal top stock being located in a plane between and substantially parallel to the top and bottom faces of said product and adjacent an open end of an aperture which extends continuously through a superposed portion.

4. A method of making a compressible foam product which comprises laterally slicing in a plane substantially parallel to its top and bottom face a slab of foam rubber having a series of reversely tapered apertures therein, the smaller end of said apertures terminating in top stock, to form at least two portions, superposing said portions so that each individual aperture in one portion has a common axis with an individual aperture in the other portions and said terminal top stock is located in a plane between and substantially parallel to the top and bottom faces of the product and adjacent an open end of an aperture which extends continuously through a superposed portion, and adhesively securing said portions together.

5. A method of making a compressible foam product which comprises laterally slicing in a plane substantially parallel to its top and bottom face a slab of foam rubber having a series of reversely tapered apertures therein the smaller end of said apertures terminating in top stock, to form two portions, superposing said portions so that each individual aperture in one portion has a common axis with an individual aperture in the other portion and said terminal top stock is located in a plane between and substantially parallel to the top and bottom faces of the product and adjacent an open end of an aperture which extends continuously through a superposed portion, and adhesively securing said portions together.

References Cited in the file of this patent

UNITED STATES PATENTS

| | | |
|---|---|---|
| 2,617,751 | Bickett | Nov. 11, 1952 |
| 2,659,418 | Berman | Nov. 17, 1953 |